United States Patent
Giese et al.

(10) Patent No.: US 10,527,106 B2
(45) Date of Patent: Jan. 7, 2020

(54) WIRE FEED LIMITER

(71) Applicant: Illinois Tool Works Inc., Glenview, IL (US)

(72) Inventors: William Giese, Monee, IL (US); Erik Miller, Madison, WI (US)

(73) Assignee: Illinois Tool Works Inc., Glenview, IL (US)

( * ) Notice: Subject to any disclaimer, the term of this patent is extended or adjusted under 35 U.S.C. 154(b) by 1081 days.

(21) Appl. No.: 14/943,249

(22) Filed: Nov. 17, 2015

(65) Prior Publication Data

US 2017/0138409 A1    May 18, 2017

(51) Int. Cl.
*B23K 9/12* (2006.01)
*F16D 7/02* (2006.01)
*B23K 9/133* (2006.01)

(52) U.S. Cl.
CPC ............... *F16D 7/025* (2013.01); *B23K 9/124* (2013.01); *B23K 9/125* (2013.01); *B23K 9/1336* (2013.01)

(58) Field of Classification Search
CPC .......... B23K 9/133; B23K 9/28; B23K 9/124; B23K 9/125; B23K 9/1336; B65H 51/30; B65H 49/34
USPC .................................................... 219/137.31
See application file for complete search history.

(56) References Cited

U.S. PATENT DOCUMENTS

| | | | |
|---|---|---|---|
| 1,541,582 A | 6/1925 | Merrill | |
| 3,293,477 A | 12/1966 | Lobosco | |
| 3,546,423 A * | 12/1970 | Scholz | B23K 9/1336 219/137.71 |
| 3,562,577 A | 2/1971 | Kensrue | |
| 3,644,701 A | 2/1972 | Kobayashi et al. | |
| 4,107,508 A * | 8/1978 | Izumi | B23K 9/1336 219/137.7 |
| 5,521,355 A * | 5/1996 | Lorentzen | B23K 9/1336 219/137.61 |
| 8,604,386 B2 | 12/2013 | Mehn | |
| 2004/0011776 A1 | 1/2004 | Mukai et al. | |
| 2006/0163230 A1 | 7/2006 | Kaufman | |
| 2008/0217313 A1 | 9/2008 | Huismann | |
| 2011/0114613 A1 | 5/2011 | Ihde | |
| 2013/0180971 A1* | 7/2013 | Peters | B65H 51/10 219/137.7 |
| 2013/0327754 A1 | 12/2013 | Salsich | |
| 2014/0054349 A1 | 2/2014 | Lahti | |
| 2014/0061178 A1 | 3/2014 | Matiash | |

FOREIGN PATENT DOCUMENTS

| | | |
|---|---|---|
| EP | 2949416 | 11/2016 |
| JP | 2006281226 | 10/2006 |

OTHER PUBLICATIONS

European Search Report for EP 16189481 dated Jan. 3, 2017 (4 pages).
International Search Report & Written Opinion for application No. PCT/US2016/057913 dated Jan. 16, 2017.

* cited by examiner

*Primary Examiner* — Brian W Jennison
(74) *Attorney, Agent, or Firm* — McAndrews, Held & Malloy, Ltd.

(57) ABSTRACT

A wire conveying mechanism, preferably for a welding, cladding or additive manufacturing apparatus, with a slip clutch mechanism connectable to a motor.

30 Claims, 4 Drawing Sheets

WIRE FEED LIMITER

The present disclosure generally relates to wire feeders. More particularly, the disclosure relates to wire feeders used in metalworking applications such as welding, cladding and additive manufacturing applications.

BACKGROUND

Wire feeders are used in various welding or cladding applications to feed wire to the welding or cladding spot. Such wire can be referred to as filler wire, additive wire or consumable wire.

Hot wire welding/cladding is a process where a metal filler wire is resistively heated, typically, to a softened/plastic/semi-liquidus state, usually by passing an electrical current through it. This reduces the amount of added heat from another high-power energy source needed for the base metal of a workpiece to which the heated wire is applied. Beneficially, heating up the wire rids it of moisture, so when it enters the welding/cladding puddle it's free of porosity, it's clean and the quality is significantly better than cold wire. The wire is typically fed in front of or behind a high-power energy source such as a laser or plasma that further melts the wire material or the wire material along with the base metal of the workpiece to produce a weld or clad. In TIG welding, the wire is fed to the TIG arc.

In arc welding processes, such as gas metal arc welding or flux-cored arc welding, an electrode wire is used to produce the weld. An arc created between the electrode and the base metal of the workpiece is used to melt a portion of the workpiece to form a molten puddle that when solidified creates a weld.

In both cases, the wire is fed into or near the puddle. This way, when a workpiece is moved relative to the welding arrangement (with either the workpiece moved or the welding equipment moved), the puddle can be maintained to create a continuous weld or cladding layer.

In hot wire welding, the start of wire feeding is sequenced very precisely to prevent arcing, or overfeeding of the wire before the process can stabilize and be in a steady state. Commonly, first the wire feed is initiated. Second, the wire contacts the workpiece. Third, heating power (e.g., electrical current applied through the wire, which has some resistance) is applied to the wire. Fourth, the wire heats to a plastic/semi-liquidus phase at the weld/clad spot, namely the weld/clad puddle. Fifth, feeding and sustained high-power energy heating of the wire occurs in the steady state.

The use of hot wire welding, such as tungsten inert gas welding, tends to be more part-related and industry-related. For example, hot wire TIG is used extensively in the transportation and power generation industries. It's big in shipbuilding, and for rebuilding turbine shafts for large power plants. Hot wire TIG also is used in cladding very large valve welds such as those for oil industry in which welders clad the inside of the valve weld with high-performance alloys.

Additionally, wire feeders can be used in additive manufacturing, sometimes referred to as 3D printing. In additive manufacturing, wire is melted to make a three-dimensional object. To that end, successive layers of melted wire are laid down under computer control. These objects can be of almost any shape or geometry, and can be produced from a 3D model or other electronic data source.

SUMMARY

Overfeeding of wire can be problematic in many applications, and especially in welding and cladding applications. In some applications, if the wire feeding is restricted near the weld area, the wire can buckle and coil or bunch up and form a so-called bird's nest. In arc welding, the wire can contact the weld spot and stick to the welding contact tip. This is called "burnback." Further, the wire can fuse to the workpiece and the continuous feeding of the electrode wire and will also cause the wire to bunch up and form a bird's nest.

In FIG. 1, there is illustrated in perspective view a wire feeder in which wire has been overfed. Wire 100, is frictionally engaged by a wheel pair comprised of upper wheel 102 and lower wheel 104 to be conveyed relative to the wheels. In this figure, the wire 100 is conveyed from left to right. The wire 100 is feed into a nozzle or welding gun 106, which is only partially shown. In FIG. 1, the wire 100 has encountered obstruction and buckled prior to the gun 106 and formed a coil or bird's nest 108.

The present disclosure describes one or more inventions relating to torque limiter or slip clutch mechanisms for wire feeders. Such mechanisms serve to reduce or end wire feeding in response to the wire fed by the feeder encountering resistance beyond a threshold. In hotwire welding, this enables the wire feeding to momentarily stop or slow until the wire again softens to the point that the set torque level is no longer exceeded. In either hotwire or arc welding, it can prevent the coiling or bunching up of the wire and the formation of bird's nests.

As used herein, a slip clutch also means a torque limiter clutch and/or a safety clutch, as those terms are understood in the mechanical arts. In such clutches, a first moving part and a second moving can be frictionally engaged for cooperative movement. However, the first moving part is allowed to slip relative to the second moving part when the first moving part encounters a higher than a threshold resistance. Usually the movement is rotational movement. For consistency, the term slip clutch is used herein.

As used herein, the term wire feed gun means any welding gun, cladding gun, additive manufacturing gun, or the like used to guide wire to an application. The wire feed gun may emit welding shielding gas in addition to the wire. The wire feed gun is positioned downstream of a wire feeding mechanism which performs the action or actions to convey the wire.

Unless specifically noted otherwise, the term metalworking apparatus is used generically to mean any welding apparatus, any cladding apparatus, any additive manufacturing apparatus and any arc welding apparatus. The term hotwire metalworking apparatus means any metalworking apparatus employing a wire that is subjected to heating prior to application of a high energy heat source.

As used herein, a high energy heat source means a laser or welding arc (which encompasses plasma).

In an embodiment, the disclosure provides a wire feeder with a slip clutch that stops, slows or limits wire feeding whenever the wire experiences a resistance above a threshold resistance.

In an embodiment, the slip clutch threshold is selectable in discrete increments.

In an embodiment, the slip clutch threshold is selectable along a continuum.

In an embodiment, the wire feeder is part of a metalworking apparatus.

In an embodiment, the wire feeder is part of a welding apparatus.

In an embodiment, the wire feeder is part of a cladding apparatus.

In an embodiment, the slip clutch is a push-type friction clutch in which the first moving part is a rotating disc and the second moving part comprises friction members mounted on a rotating member.

In an embodiment, the rotating disc is fixed relative to a rotating shaft and the rotating member rotates freely relative to the rotating shaft.

In an embodiment, the second moving part includes a gear.

In an embodiment, the wire feeder includes one or more wheels that frictionally engage with the wire to cause the wire to be conveyed, each such wheel including a gear meshed with the gear of the second moving part.

In an embodiment, the second moving part is mounted on the rotating shaft and is retained on the shaft by means of an adjustable spring mechanism.

In an embodiment, the adjustable spring mechanism includes a nut threadingly received on an end of the shaft and a helical spring between the nut and the rotating member.

In an embodiment, adjustable spring mechanism includes a bearing between the spring and the rotating member.

In an embodiment, the second moving part includes a friction pad disc to which are secured friction pads and a gear to which the friction pad disc is secured.

In an embodiment, the first moving part includes a driving disc mounted on and keyed to the rotating shaft and a slip surface disc secured to the driving disc.

In an embodiment, the wire feeder includes four wheels disposed in two wheel pairs, each wheel frictionally engaging the wire to convey the wire relative to the wheels, the wire being gripped between the wheels of each wheel pair, each wheel having a gear meshed with the gear of the second moving part.

In an embodiment, a metalworking apparatus includes one of the foregoing slip clutches.

In an embodiment, a metalworking apparatus includes one of the foregoing wire feeders with one of the foregoing slip clutches.

These and other features are described below in greater detail with reference to the accompanying drawings.

DETAILED DESCRIPTION

Figure 1:
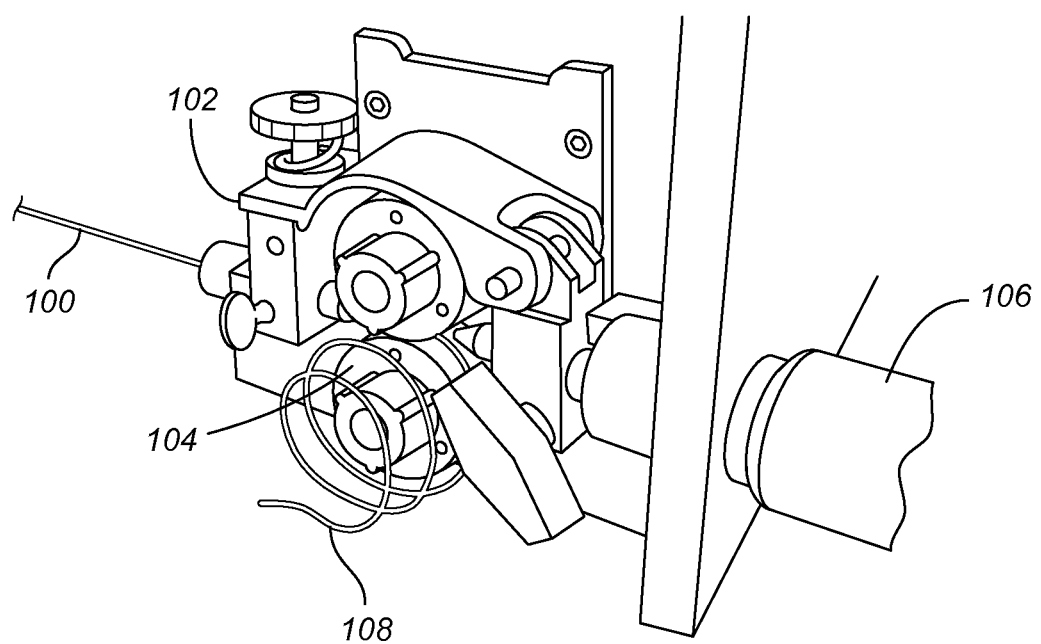
FIG. 1 illustrates in perspective view a wired feeder in which excessive wire has been fed by the wire feeder.

The present disclosure is herein described in detail with reference to embodiments illustrated in the drawings, which form a part hereof. Other embodiments may be used and/or other changes may be made without departing from the spirit or scope of the present disclosure. The illustrative embodiments described in the detailed description are not meant to be limiting of the subject matter presented herein.

Reference will now be made to the exemplary embodiments illustrated in the drawings, and specific language will be used herein to describe the same. It will nevertheless be understood that no limitation of the scope of the invention is thereby intended. Alterations and further modifications of the inventive features illustrated herein, and additional applications of the principles of the inventions as illustrated herein, which would occur to one skilled in the relevant art and having possession of this disclosure, are to be considered within the scope of the present disclosure.

Figure 2:
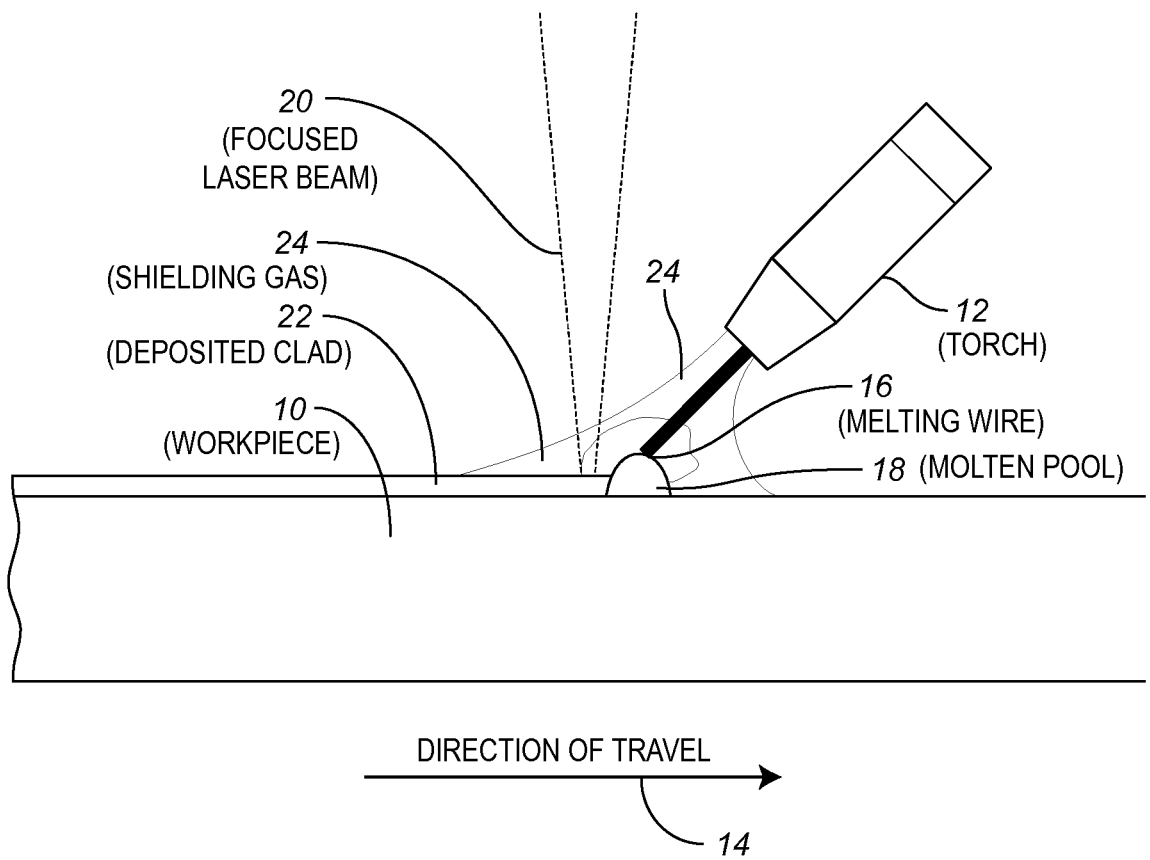
FIG. 2 illustrates in general a hotwire welding or cladding arrangement.

In FIG. 2 there is illustrated a hotwire laser welding/cladding arrangement/process in which one or more of the present inventions can be used. As illustrated, a metallic workpiece 10 and wire feeding gun or torch 12 are positioned for relative travel between them. The workpiece 10 is representative of a base metal of any suitable workpiece. The direction of travel of the wire feeding gun 12 relative to the workpiece 10 is indicated by arrow 14.

Note that the relative direction of travel is not necessarily linear. The workpiece 10 could rotate about a horizontal axis, for example a pipe rotation about its cylindrical axis, or it could rotate about a vertical axis, for example, a wheel mounted in a horizontal plane. The workpiece might also be moved three dimensionally, as with multi-axis robotic welding.

In process steady-state, wire 16 is feed out of the wire feed gun 12 toward a molten pool or puddle 18. At the same time, the molten pool is subject to heating by a high energy source, in this case a focused laser beam 20, that further melts the wire 16 and, if a welding process, a portion of the metallic workpiece 10 (i.e., the base metal) to form the puddle 18.

Since the workpiece 10 is moving relative to wire feed gun 12 and the high energy source 20, the molten metal comprised of molten wire and, if a welding process, molten workpiece metal, exiting the incidence area of the high energy 20 cools and solidifies to form a clad layer, an additive layer, or if a welding process, a weld, 22.

In this illustrative process, shielding gas 24 is also provided via the wire feed gun 12.

Figure 3:
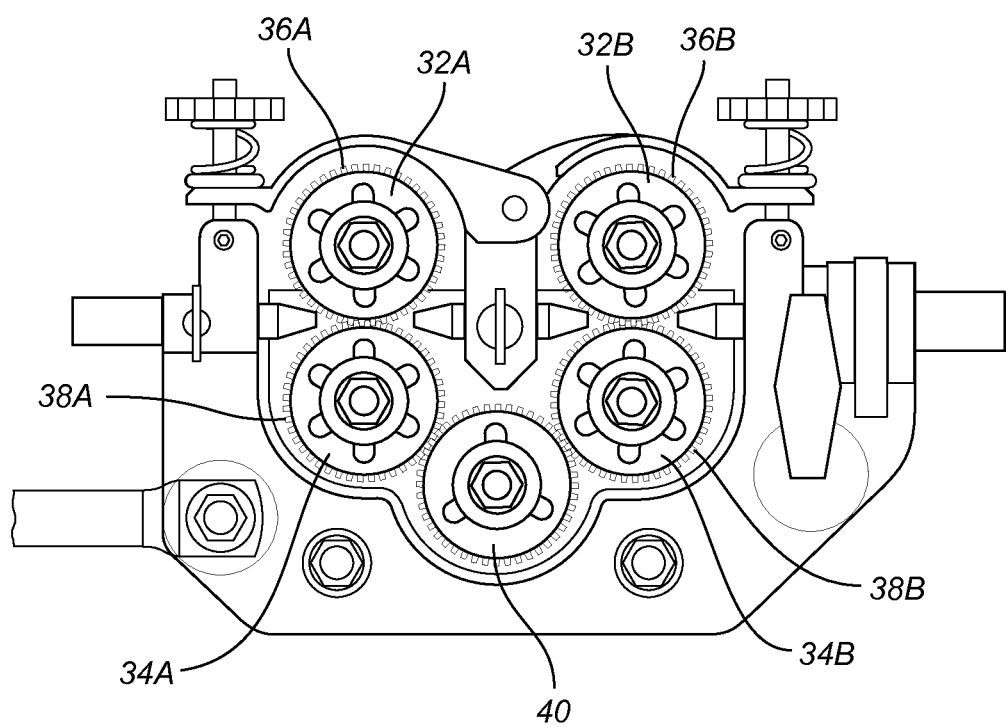
FIG. 3 illustrate in side view a wire feeder using in a welding or cladding arrangement.

In FIG. 3, there is illustrated in side view a wire feeding mechanism suitable for feeding the wire 16 through the wire feed gun 12. In a housing 30, there are provide upper wheels 32a and 32b and lower wheels 34a and 34b. The wheels are paired such that wheels 32a and 34a form one pair and wheels 32b and 34b form another pair. The each wheel pair frictionally engages the wire 16 so at to convey the wire 16 between the upper and lower wheels. In this figure, the wire 16 is feed from right to left.

As can be seen, the wheels are provided with respective gears 36a, 36b, 38a and 38b. The gears 36a and 38a are intermeshed so that driving of wheel 34a also drives wheel 32a in the known way. Similarly, gears 36b and 38b are intermeshed so that driving of wheel 34b also drives wheel 32b in the known way.

Positioned between wheels 32b and 34b is a driving gear 40 which is intermeshed with the gears 36b and 38b in the known way.

Figure 4:
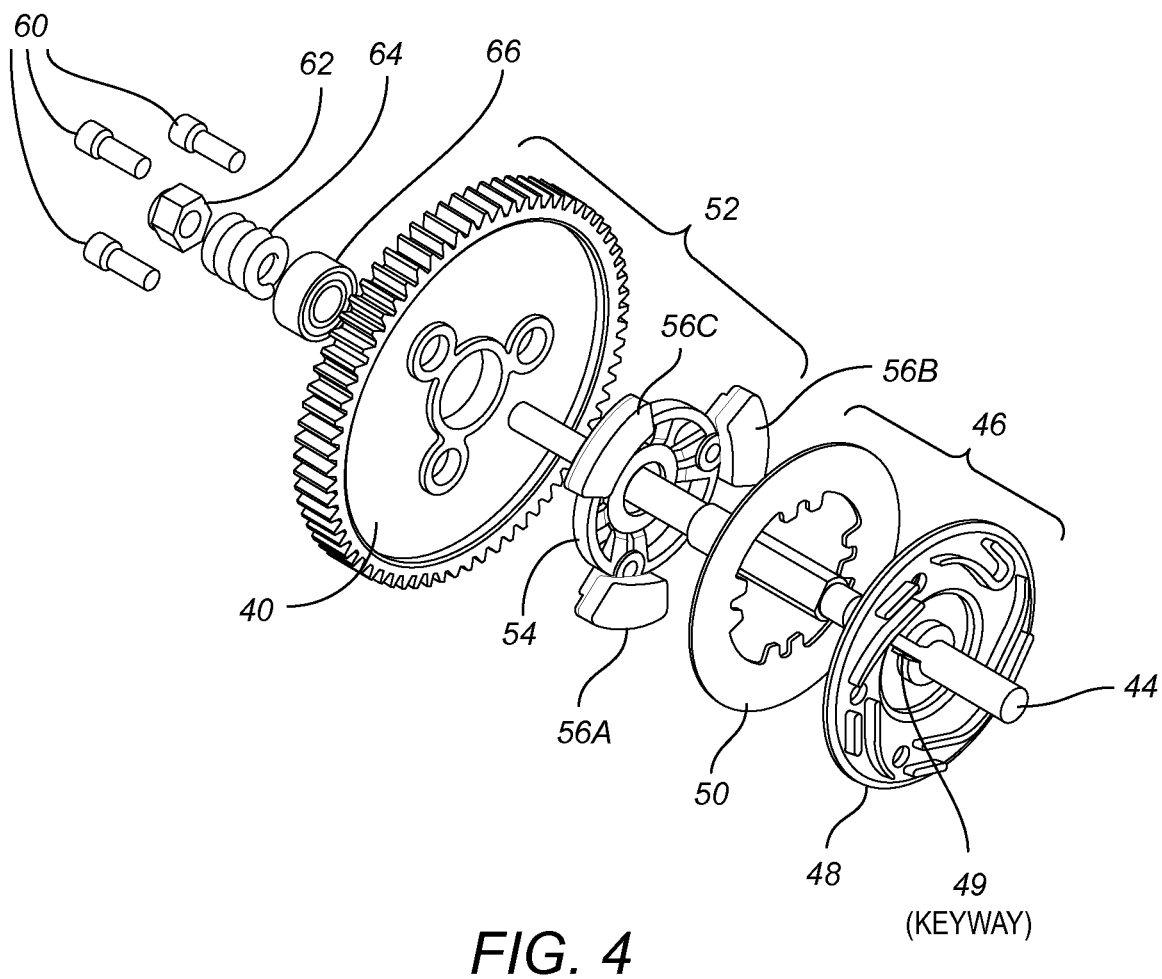
FIG. 4 illustrates in exploded view a push-type slip clutch mechanism that can be used in a wire feeder.

In FIG. 4, there is illustrated in exploded view, a slip clutch mechanism 42 including the gear 40. As illustrated, the slip clutch 42 includes a rotating shaft 44 that is driven by a motor. Secured to the rotating shaft 44 is a first moving part 46 that includes a driving disc 48, that includes a keyway 49 that accommodates a key 44a on the shaft 44 so that the driving disc 48 rotates with the shaft 44.

A slip surface disc or pressure plate 50 is positioned against the driving disc 48 for rotation therewith due to an inner periphery profile that mates with a raised profile on the driving disc 48. The specifics of the way in which the discs 50 and 48 engage each other, if at all, are not material, so long as an appropriate or sufficient slip or pressure surface facing a second moving part 52, described below, is provided.

The second moving part 52, the components of which are described below, is also received on the rotating shaft 42. However, the second moving part 52 is not secured to the shaft 42 and is free to rotate relative to the shaft 42.

The second moving part 52 includes the gear 40. Secured to the gear 40 is a clutch pad part 54 that includes three friction material shoes or pads 56a-56c mounted on brackets 58a-58c, respectively. The clutch pad part 54 is secured to the gear 40 by means of three bolts 60. The clutch shoes/pads 56a-56c face the slip/pressure surface of the slip surface disc 50.

The gear 40 is received on one end of the shaft 44 but does not include any keying arrangement so that it is free to rotate relative to the shaft 44. The gear 40 is held on the shaft 44 by means of a nut 62. Between the nut 62 and the gear 40 is a pressure spring 64 and bearing 66. By adjusting the nut 62 it is possible to adjust the amount of pressure of the shoes/pads 56a-56c against the slip surface. As can be appreciated, with less pressure, the shoes/pads 56a-56c will experience less friction on the slip/pressure surface, and thus be able to slip relative to the slip surface. In turn, the gear 40 will slip relative to the rotation of the shaft 44.

Conversely, suitable tightening of the nut 60 will cause the spring 64 to exert more pressure against the bearing 66 and the gear 40, so that the shoes/pads 56a-56c in turn exert more pressure against the slip/pressure surface. Thus the pads 56a-56c will experience greater friction and be caused slip less relative to the slip/pressure surface, and thus the gear 40 will be caused to rotate more in concert with the rotation of the shaft 44.

The foregoing slip clutch mechanism uses what is referred to as an axial pressure plate mechanism or a push type mechanism. Alternatively, a radial pressure plate mechanism or centrifugal clutch mechanism might be used in which friction pads are positioned in a flywheel mechanism on a driving rotating part so with increasing rotation and centrifugal force, the pads exert increasing radial force. Such types of clutches are well known and come in many designs. Also, the slip/pressure surface is a cylindrical surface on the driven rotating part within which the friction pads rotate, as would be understood by those of ordinary skill in this art. The pressure of the pads would be adjustable by known adjustment mechanisms that would impede or facilitate the ability of the pads to extend radially due to rotation of the shaft. Other clutches use radial spring pressure to the same effect.

Regardless of the type of slip clutching mechanism, the pressure or resistance needed for the friction pads to not slip is a function of, among other things, the size of the wire, and the material of which the wire is made. Thinner wire which tends to be flimsier, requires less pressure to feed it through the feeding assembly. Similarly, softer metals require more delicate handling and thus lower pressures to feed it through the feeding assembly.

It can be appreciated that the above describe axial pressure adjustment mechanism provided by the nut 62 and the spring 64, is a form of a continuously variable adjustment mechanism in that the nut can be tightened or loosening at virtually, if not actually, infinite positions along a continuum between completely disengaged to fully tightened. However, other mechanisms that can be used include incremental adjustment mechanisms in which the tightening unit includes discrete positions. An example is a spring loaded nut with detents.

In one method for determining a suitable resistance threshold for the wire, and thus the pressure for the pressure applying mechanism, as an initial set-up, the wire is fed through the feeding mechanism under cold conditions under the control of the drive gear 40. However, the pressure is adjusted so that the clutch barely does not slip so that the feeding is very slow. Then the pressure is adjusted to an increased level until the desired feeding speed is reached. At this point, any further resistance encountered by the wire causes the wire to resist feeding by the wheels 32a, 32b, 34a and 34b and, in turn, the gear 40 to slip relative to the shaft 44.

It can be appreciated that a structure such as the foregoing enables the momentary stop of the wire by means of mechanical slippage of a clutch mechanism. However, the feed wheels maintain pressure between the wire and the workpiece, but will not move the wire until it is soft enough to plastically deform, melt and flow.

It is possible to measure this resistance using a load cell or some other suitable device so that the pressure setting can be repeated by simply referring to the measured values.

In a typical hotwire welding arrangement, the load of the wire will be about 20-30 lbs. of force at steady state. Thus, the threshold setting for the slip clutch will typically fall within this range.

At the same time, the feed rate of the wire will typically be about 400 inches per minute (ipm) at steady state. During start-up, the feed could be slow, e.g. 50 ipm. Feed speeds up to 700 ipm are also contemplated.

Also, it typically takes about 1.0 to 1.5 seconds to reach steady state. The first 0.75 second or so is spent for the wire to heat up to the semi-liquidus state.

In addition to the above described four driven wheel arrangement of FIG. 3, the two driven wheel arrangement of, e.g., FIG. 1 can be similarly be adapted with a suitable clutch mechanism. Other numbers and arrangements of driven wheels can also be used with similar slip clutch mechanisms.

The preceding description of the disclosed embodiments is provided to enable any person skilled in the art to make or use the present invention. Various modifications to these embodiments will be readily apparent to those skilled in the art, and the generic principles defined here may be applied to other embodiments without departing from the spirit or scope of the invention. Thus, the present invention is not intended to be limited to the embodiments shown here but is to be accorded the widest scope consistent with the following claims and the principles and novel features disclosed here.

What is claimed is:

1. A wire conveying mechanism comprising a slip clutch mechanism connectable to a motor,
    wherein the slip clutch mechanism is a push-type friction clutch having first and second moving parts and a shaft, the first moving part comprising a rotating disc received on the shaft and the second moving part comprising friction members mounted on a rotating member also received on the shaft, and
    wherein the rotating disc is fixed relative to the shaft and the rotating member rotates freely relative to the shaft.

2. The wire conveying mechanism of claim 1, wherein the slip clutch mechanism has a threshold resistance selection mechanism via which a threshold resistance can be selected in discrete increments.

3. The wire conveying mechanism of claim 1, wherein the slip clutch mechanism has a threshold resistance selection mechanism via which a threshold resistance can be selected along a continuum.

4. The wire conveying mechanism of claim 1, wherein the second moving part includes a gear.

5. The wire conveying mechanism of claim 4, further comprising one or more wheels that frictionally engage with a wire to cause the wire to be conveyed, each such wheel including a second gear meshed with the gear of the second moving part.

6. The wire conveying mechanism of claim 1, wherein the slip clutch mechanism further comprises a threshold resistance selection mechanism via which a threshold resistance can be selected, the threshold resistance selection mechanism including a spring that applies pressure against the rotating disc of the second moving part.

7. The wire conveying mechanism of claim 1, wherein the slip clutch mechanism further comprises a threshold resistance selection mechanism via which a threshold resistance can be selected, the threshold resistance selection mechanism including a nut threadingly received on an end of the shaft and a helical spring between the nut and the second moving part.

8. The wire conveying mechanism of claim 1, the second moving part includes a friction pad disc to which are secured friction pads and a gear to which the friction pad disc is secured.

9. The wire conveying mechanism of claim 4, further comprising four wheels disposed in two wheel pairs, each of the four wheels frictionally engaging a wire to convey the wire relative to the four wheels, the wire being gripped between the wheels of each wheel pair, each wheel having a second gear meshed with the gear of the second moving part.

10. A metal-working apparatus comprising:
a wire feed gun; and
a wire feeder positioned to feed a wire to the wire feed gun,
wherein, the wire feeder includes a push-type friction slip clutch mechanism having first and second moving parts and a shaft, the first moving part comprising a rotating disc received on the shaft and the second moving part comprising friction members mounted on a rotating member also received on the shaft, and
wherein the rotating disc is fixed relative to the shaft and the rotating member rotates freely relative to the shaft.

11. The metal-working apparatus of claim 10, wherein the push-type friction slip clutch mechanism has a threshold resistance selection mechanism via which a threshold resistance can be selected in discrete increments.

12. The metal-working apparatus of claim 10, wherein the push-type friction slip clutch mechanism has a threshold resistance selection mechanism via which a threshold resistance can be selected along a continuum.

13. The metal-working apparatus of claim 10, wherein the second moving part includes a gear.

14. The metal-working apparatus of claim 13, further comprising one or more wheels that frictionally engage with the wire to cause the wire to be conveyed, each such wheel including a second gear meshed with the gear of the second moving part.

15. The metal-working apparatus of claim 12, wherein the threshold resistance selection mechanism includes a spring that applies pressure against the rotating disc of the second moving part.

16. The metal-working apparatus of claim 12, wherein the threshold resistance selection mechanism includes a nut threadingly received on an end of the shaft and a helical spring between the nut and the second moving part.

17. The metal-working apparatus of claim 10, the second moving part includes a friction pad disc to which are secured friction pads and a gear to which the friction pad disc is secured.

18. The metal-working apparatus of claim 13, comprising four wheels disposed in two wheel pairs, each wheel frictionally engaging the wire to convey the wire relative to the wheels, the wire being gripped between the wheels of each wheel pair, each wheel having a second gear meshed with the gear of the second moving part.

19. An apparatus comprising:
a wire feed gun;
a wire feeder positioned to feed a wire to the wire feed gun, the wire feeder including a slip clutch that prevents feeding of the wire when the wire encounters a resistance above a threshold,
wherein the slip clutch is a push-type friction clutch having first and second moving parts and a shaft, the first moving part comprising a rotating disc received on the shaft and the second moving part comprising friction members mounted on a rotating member also received on the shaft, and
wherein the rotating disc is fixed relative to the shaft and the rotating member rotates freely relative to the shaft.

20. The apparatus of claim 19, wherein the slip clutch includes a threshold resistance selection mechanism via which the threshold resistance can be selected.

21. The apparatus of claim 19, further comprising a high energy source that melts the wire exiting the wire feed gun.

22. The apparatus of claim 21, further comprising an energy source that preheats the wire before it is melted by the high energy source.

23. The apparatus of claim 20, wherein the slip clutch has a threshold resistance selection mechanism via which the threshold resistance can be selected in discrete increments.

24. The apparatus of claim 20, wherein the slip clutch has a threshold resistance selection mechanism via which a threshold resistance can be selected along a continuum.

25. The apparatus of claim 19, wherein the second moving part includes a gear.

26. The apparatus of claim 25, further comprising one or more wheels that frictionally engage with the wire to cause the wire to be conveyed, each such wheel including a second gear meshed with the gear of the second moving part.

27. The apparatus of claim 20, wherein the threshold resistance selection mechanism includes a spring that applies pressure against the rotating disc of the second moving part.

28. The apparatus of claim 20, wherein the threshold resistance selection mechanism includes a nut threadingly received on an end of the shaft and a helical spring between the nut and the second moving part.

29. The apparatus of claim 19, the second moving part includes a friction pad disc to which are secured friction pads and a gear to which the friction pad disc is secured.

30. The apparatus of claim 25, wherein the slip clutch comprises four wheels disposed in two wheel pairs, each wheel frictionally engaging the wire to convey the wire relative to the wheels, the wire being gripped between the wheels of each wheel pair, each wheel having a second gear meshed with the gear of the second moving part.

* * * * *